United States Patent
Yamazaki (10) Patent No.: US 8,767,079 B2
(45) Date of Patent: Jul. 1, 2014

(54) IMAGE CAPTURE APPARATUS AND CONTROL METHOD THEREOF

(75) Inventor: Tatsuya Yamazaki, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 567 days.

(21) Appl. No.: 12/966,644

(22) Filed: Dec. 13, 2010

(65) Prior Publication Data

US 2011/0157380 A1  Jun. 30, 2011

(30) Foreign Application Priority Data

Dec. 25, 2009 (JP) ................................ 2009-296385

(51) Int. Cl.
*H04N 5/228* (2006.01)

(52) U.S. Cl.
USPC .................... 348/208.2; 348/208.14

(58) Field of Classification Search
USPC .............................. 348/208.99, 208.2, 208.14
See application file for complete search history.

(56) References Cited

U.S. PATENT DOCUMENTS

| | | | | |
|---|---|---|---|---|
| 5,422,673 | A * | 6/1995 | Kondo et al. | 348/352 |
| 5,943,169 | A * | 8/1999 | Okada | 359/557 |
| 7,460,772 | B2 | 12/2008 | Ishikawa et al. | |
| 7,969,470 | B2 * | 6/2011 | Kishida | 348/208.14 |
| 2008/0252736 | A1 * | 10/2008 | McLeod | 348/208.99 |
| 2009/0128638 | A1 | 5/2009 | Okada | |
| 2009/0309985 | A1 * | 12/2009 | Ibi | 348/208.4 |
| 2013/0163972 | A1 * | 6/2013 | Miyazawa | 396/55 |

FOREIGN PATENT DOCUMENTS

| | | | | |
|---|---|---|---|---|
| JP | 2001-024934 A | 1/2001 | | |
| JP | 2005203861 A | * 7/2005 | ............ | H04N 5/232 |
| JP | 2006-003439 | 1/2006 | | |
| JP | 2009-105784 | 5/2009 | | |
| JP | 2009-171327 | 7/2009 | | |
| JP | 2009-300614 A | 12/2009 | | |

OTHER PUBLICATIONS

English translation of JP-2005203861—A Kumaki et al Jul. 2005.*
The above foreign patent documents were cited in a Jul. 26, 2013 Japanese Office Action, which is enclosed without an English Translation, that issued in Japanese Patent Application No. 2009-296385.

* cited by examiner

*Primary Examiner* — James Hannett
(74) *Attorney, Agent, or Firm* — Cowan, Liebowitz & Latman, P.C.

(57) ABSTRACT

This invention comprises an image sensor which captures a moving image of an object, the image of which is formed by an imaging lens, a first detection unit which detects vibration of an image capture apparatus, a second detection unit which detects movement of the object based on an image signal for each image capture period which is output by the image sensor, a distance detection unit which detects an object distance, which is a distance from the image capture apparatus to the object, a changing unit which changes an output of the second detection unit based on the object distance which is detected by the distance detection unit, and a driving unit which drives a vibration correction unit, which optically performs vibration correction, based on an output of the first detection unit and an output of the second detection unit which is changed by the changing unit.

20 Claims, 10 Drawing Sheets

IMAGE CAPTURE APPARATUS AND CONTROL METHOD THEREOF

BACKGROUND OF THE INVENTION

1. Field of the Invention

The present invention relates to an image capture apparatus having a vibration correction function, and a control method of the image capture apparatus.

2. Description of the Related Art

As one of vibration correction devices incorporated in image capture apparatuses, for example, digital cameras, video cameras or the like, an optical vibration correction device is known. An optical vibration correction device performs vibration correction by driving part of (hereinafter referred to as a shift lens) an image capture lens in a direction perpendicular to the optical axis for changing the optical axis. Such vibration correction devices detect vibrations from a photographer's hand using an angular velocity sensor and drive the shift lens so as to correct the detected vibration, thereby achieving vibration correction.

The vibration detected by the angular velocity sensor is vibration involving the image capture apparatus' rotational direction (rotational vibration). In ordinary use, correcting this vibration achieves a sufficient image stabilization effect. However, if an object to be captured is in close proximity to the image capture apparatus (i.e., in the case of macro-image capture) or the lens has a particularly high zoom factor, vibration components increase due to an influence of "parallel vibration" which is caused by parallel movement of the image capture apparatus. When the influence of parallel vibration becomes large, vibration cannot be detected by the angular velocity sensor. In view of this, there is a proposed technique for using both an angular velocity sensor and an acceleration sensor for detecting rotational vibration and parallel vibration, and correcting them (Japanese Patent Laid-Open No. 2006-3439).

Furthermore, the following method is also proposed as a parallel vibration correction method without using a sensor such as an acceleration sensor. More specifically, in addition to vibration detector such as an angular velocity sensor, an image sensor for detecting a motion vector of the entire image is separately provided. An output of the angular velocity sensor is subtracted from the motion vector of the entire image for extracting the parallel vibration components, and a correction amount is calculated based on the parallel vibration (Japanese Patent Laid-Open No. 2009-105784).

Moreover, there is a proposed method, in a case of taking macro-image, which suggests the superimposition of a plurality of numbers of images in order to reduce vibration caused by an influence of parallel vibration (Japanese Patent Laid-Open No. 2009-171327).

However, the above-described conventional methods require an acceleration sensor or an additional image sensor for detecting parallel vibration. Furthermore, although vibration detection can be realized without an additional structure in image superimposition using firmware, problems of long processing time and unstable correction effects still remain.

SUMMARY OF THE INVENTION

The present invention has been made in view of the above-described problems. This invention enables, in an image capture apparatus having a vibration correction device, correction of parallel vibration without using a new sensor, a particular firmware, or the like.

According to a first aspect of the present invention, there is provided an image capture apparatus comprising: an image sensor configured to capture a moving image of an object image which is formed by an imaging lens; a first detection unit configured to detect vibration of the image capture apparatus; a second detection unit configured to detect movement of the object based on an image signal for each image capture period which is output by the image sensor; a distance detection unit configured to detect an object distance, which is a distance from the image capture apparatus to the object; a changing unit configured to change an output of the second detection unit based on the object distance which is detected by the distance detection unit; and a driving unit configured to drive a vibration correction unit, which optically performs vibration correction, based on an output of the first detection unit and the output of the second detection unit which is changed by the changing unit.

According to a second aspect of the present invention there is provided a control method of an image capture apparatus having an image sensor for capturing a moving image of an object image which is formed by an imaging lens, comprising the steps of: first detecting vibration of the image capture apparatus; second detecting movement of the object based on an image signal for each image capture period which is output by the image sensor; detecting an object distance, which is a distance from the image capture apparatus to the object; changing an output of the second detecting step based on the object distance which is detected in the distance detecting step; and driving a vibration correction unit, which optically performs vibration correction, based on an output of the first detecting step and the output of the second detecting step which is changed by the changing step.

Further features of the present invention will become apparent from the following description of exemplary embodiments with reference to the attached drawings.

DESCRIPTION OF THE EMBODIMENTS

[First Embodiment]

Figure 1:
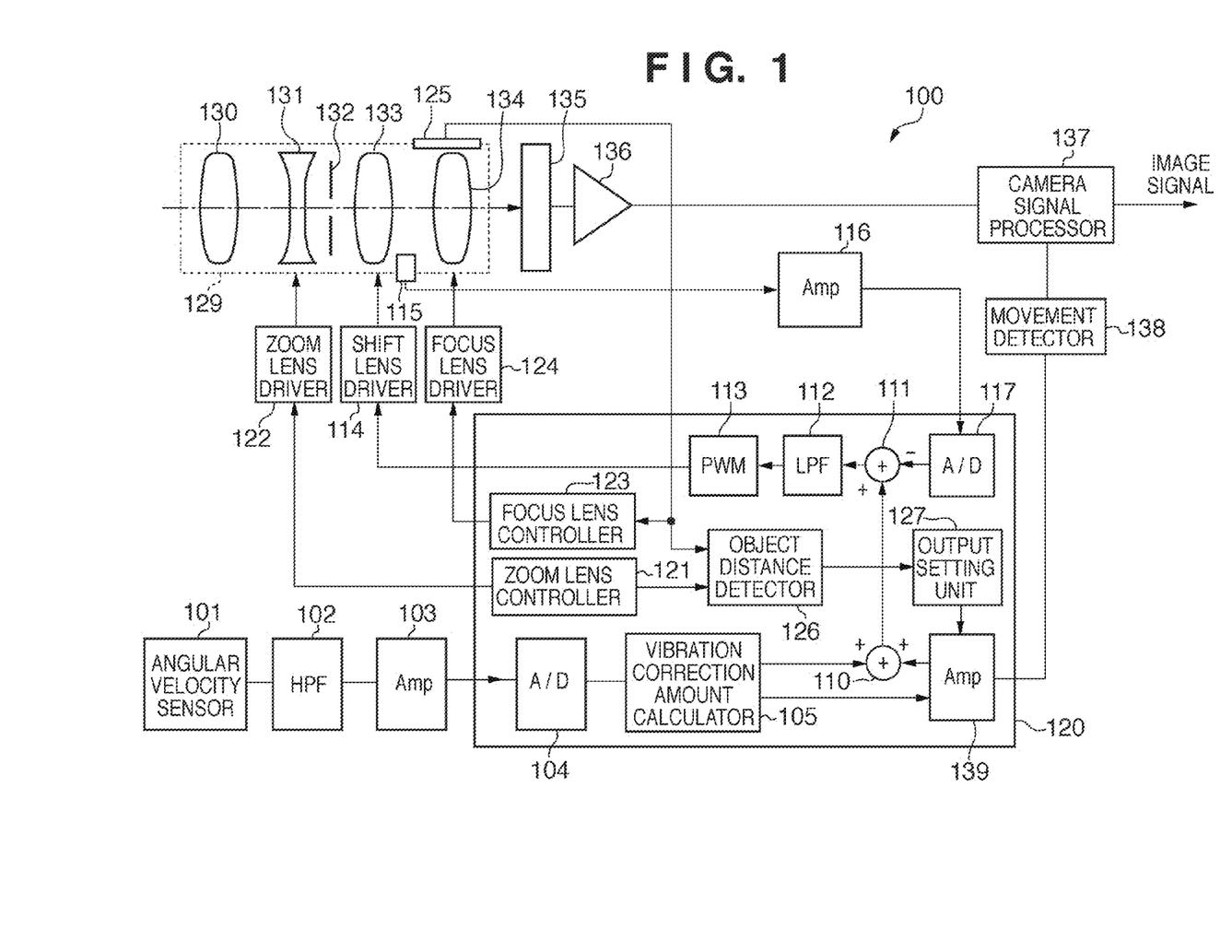
FIG. 1 is a block diagram showing a configuration of an image capture apparatus according to the first embodiment of the present invention.

FIG. 1 is a block diagram showing a configuration of an image capture apparatus according to the first embodiment of the present invention. Hereinafter, assume that the image capture apparatus according to the present embodiment captures, with an image sensor, moving images of an object which passes through the imaging lens and outputs image signals for each predetermined image capture period (one field). Further, while a first detector (vibration detection sensor 101) detects vibration of the image capture apparatus, a second detector (movement detector 138) detects, from image signals of the image sensor, a motion vector of an image for each field as a vibration remainder signal. Based on outputs from the first and second detectors, a vibration correction unit (shift lenses 133), which is arranged inside the imaging lens for optically correcting vibration, is driven to correct image vibration caused by vibration of the image capture apparatus.

In FIG. 1, the image capture apparatus 100 comprises a lens unit (imaging lens) 129 which includes fixed lenses 130, zoom lenses 131, a diaphragm 132, shift lenses 133, and focus compensator lenses (hereinafter referred to as focus lenses) 134. The image capture apparatus 100 also comprises an image sensor 135 having a CCD, a CMOS sensor and the like, an analog signal processor 136, a camera signal processor 137, a movement detector 138, a shift lens driver 114, a position sensor 115 which detects the position of the shift lenses 133, and an amplifier 116. The image capture apparatus 100 also comprises a zoom lens driver 122, a focus lens driver 124, a focus lens position sensor 125, a vibration detection sensor 101, a high-pass filter (HPF) 102, an amplifier 103, and a camera-system-control microcomputer (hereinafter referred to as a microcomputer) 120. Further, the microcomputer 120 comprises A/D converters 104 and 117, a vibration correction amount calculator 105, adders 110 and 111, a low-pass filter (LPF) 112, a pulse-width modulator (PWM) 113. The microcomputer 120 also comprises a zoom lens controller 121, a focus lens controller 123, an object distance detector 126, and an output setting unit 127. The zoom lens controller 121 also has a position detection function for detecting the position of the zoom lenses 131.

Vibration correction is now described with reference to FIG. 1. In FIG. 1, the vibration detection sensor 101, which is for instance an angular velocity sensor using vibration gyros, detects vibration applied to the image capture apparatus caused by hand jiggling or the like. The HPF 102 removes drift or the like from the vibration output of the vibration detection sensor 101. The amplifier 103 amplifies the detected vibration output (in this embodiment, an angular velocity signal). The microcomputer 120 controls the entire image capture apparatus, such as vibration correction, AF, zoom, AE and so forth. For a simplified description, only the configuration necessary for this embodiment is shown herein.

The A/D converter 104 incorporated in the microcomputer 120 converts angular velocity signals to digital signals for obtaining angular velocity data. Based on the angular velocity data, the vibration correction amount calculator 105 generates angular signals (driving target value of the shift lenses 133). Also, the vibration correction amount calculator 105 can detect, based on the aforementioned angular velocity data and angular signals, whether or not the image capture apparatus 100 is being panned. Meanwhile, as similar to the A/D converter 104, the A/D converter 117 incorporated in the microcomputer 120 converts an output of the position sensor 115 of the shift lenses 133, which is amplified by the amplifier 116, to digital signals and outputs them as position data.

The adder 111 calculates a difference between the current position of the shift lenses 133 and the driving target value, acquiring the output as an actual correction amount. The LPF 112 is a filter for reducing driving noise of the shift lens driver (H bridge driver) 114. An output of the LPF 112 is modulated by the PWM 113 and output as PWM signals by the microcomputer 120. In accordance with the PWM signals, the shift lenses 133 are driven by the shift lens driver 114.

By virtue of the shift lenses 133 being driven, a vibration-corrected image is formed on the image sensor 135 through the lens unit 129, and the image sensor 135 photoelectrically converts the formed object image. The analog signal processor 136 performs predetermined processing on signals obtained by the image sensor 135 and generates analog image-capturing signals. The analog signal processor 136 is configured with, for instance, a co-related double sampling (CDS) circuit, an automatic gain control (AGC) circuit, and so forth. A camera signal processor 137, which includes an A/D converter, performs digital signal processing. It generates an image signal for each field.

The movement detector 138 detects, as a vibration remainder signal, a motion vector of an image for each field. A predetermined gain is given to the vibration remainder signal by the amplifier 139 and fed back as a vibration remainder correction amount. Note that since the amplifier 139 has a variable gain, an appropriate gain can be set in accordance with mode setting or a gain-change instruction. The vibration remainder correction amount detected here corresponds to an error between the actual camera vibration amount and a detection signal of the angular velocity sensor. For the purpose of reducing correction errors, a correction error is detected by using the motion vector of the image, then added to the correction amount calculated by the adder 110 based on the angular velocity signal, and fed back to the operation of the shift lenses 133. As a result, excellent vibration correction with suppressed vibration remainders is realized.

Figure 10A:
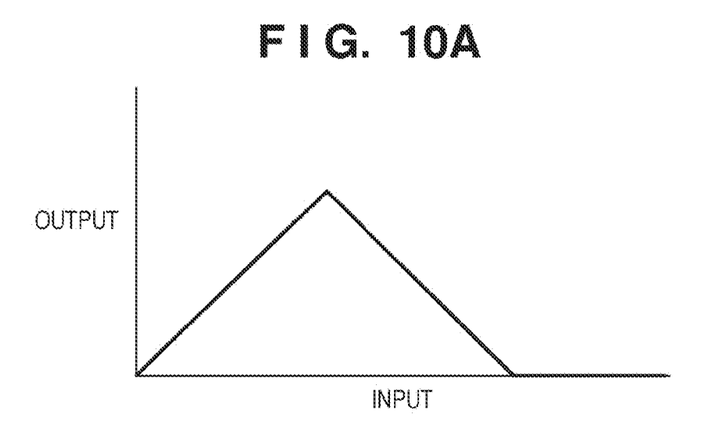
FIG. 10A is a view showing a high-frequency component removal filter.

In the above-described vibration correction, the movement detector 138 compares an image of the current field (or frame) with an image of at least one field (or frame) previous to the current field (or frame), and acquires the amount of movement of the representative point on the image as a motion vector of the image, in other words, the camera's vibration amount. Calculation of the movement vector involves time lag that corresponds to at least one field. This is due to the image accumulation time of the image sensor 135 and image matching time of the movement detector 138. Since the vibration correction operation forms a feedback loop through optical correction means, depending on the time lag and control frequency, system instability may occur and an oscillation state may result. To cope with this, in general, a filter having an input/output characteristic shown in FIG. 10A is used to cut high-frequency components to prevent oscillation. If, for instance, a variation amount per unit time is compared between signals having same amplitude but different frequencies, a signal having a low frequency has a smaller variation amount per unit time. Therefore, using the filter having an input/output characteristic shown in FIG. 10A can, as a result, attenuate or remove signals having high frequencies.

Figure 10B:
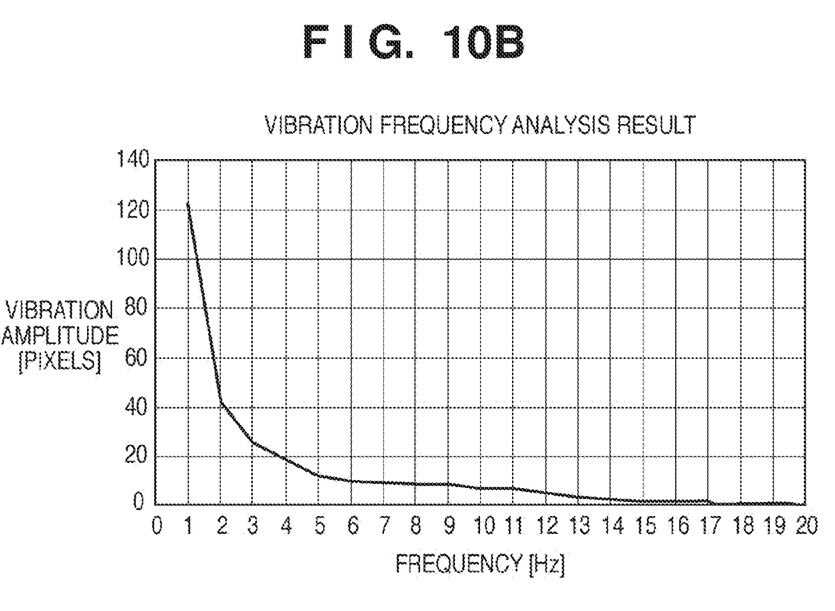
FIG. 10B is a view showing a frequency analysis result of vibration signals at the time of taking moving image.

Meanwhile, FIG. 10B shows a result of frequency analysis of hand vibration (rotational vibration) which is detected by a gyro sensor (angular velocity sensor) at the time of taking a general moving image. In hand vibration, the lower the frequency, the larger the amplitude. This is because the vibration transmitted from hands to the image capture apparatus is caused by, rather than hand jiggling, the photographer's overall body movement. However, if this vibration is to be corrected completely by the image motion vector, the correction amount will exceed the correctable angle of the shift lenses 133 (movable amount of the shift lenses). As a result, the lenses may come to a dead end. In actual control, the amplifier 139 multiplies the image movement vector by a predetermined minus gain, thereby taking measures against "dead-end" lenses. By virtue of the above-described configuration, actual vibration correction is realized.

Next, an object distance detection method is described. In FIG. 1, the zoom lens controller 121 performs driving control (control of changing magnification) of the zoom lenses (magnification lens) 131. In accordance with a state of the zoom switch (not shown), the zoom lens driver 122 is controlled for driving the zoom lenses 131 and changing the focal length. In general, for the motor which drives the zoom lenses, a stepping motor is used. By counting the number of driving pulses, the position of the zoom lenses 131 can be detected. As a result, the current focal length can be acquired from the position of the zoom lenses 131 (focal length detection). The focus lens controller 123 performs driving control of the focus lenses 134. Using an AF evaluation circuit (not shown) which is incorporated in the camera signal processor 137, a signal indicative of the focus level is extracted from image signals, and the focus lens driver 124 is controlled with feedback from the extracted signal and an output signal from the focus lens position sensor 125. Then, the focus lenses 134 are driven for realizing a focused state.

Figure 5A:
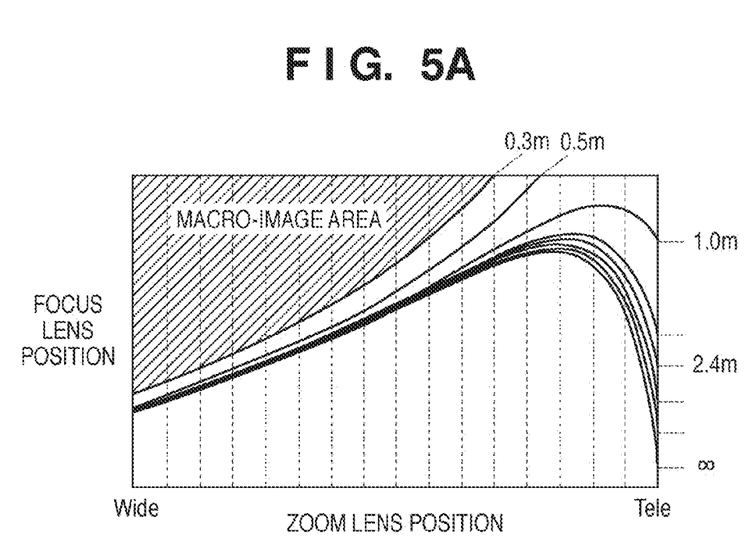
FIG. 5A is a graph showing a macro-image capture area.

The object distance detector 126 detects an object distance based on the position of the zoom lenses 131 detected by the zoom lens controller 121 and an output from the focus lens position sensor 125. In the lens unit 129 according to the present embodiment, the focus lenses 134 also play a role as a compensator lens for correcting an out-of-focus state that has been caused by movement of the zoom lenses 131. The relation between a zoom lens position and a focus lens position is shown in FIG. 5A. Accordingly, based on position data from the zoom lenses 131 and the focus lenses 134, an object distance can be detected.

As is apparent from FIG. 5A, the closest approach distance becomes short at the wide end of the lens unit 129. At the wide end, a close-up image of about one centimeter can be taken. At a focal length position which is about four times as long as the wide-end focal length, a close-up image of up to 30 centimeters can be taken. In other words, macro-image can be taken at the wide end.

Figure 3A:
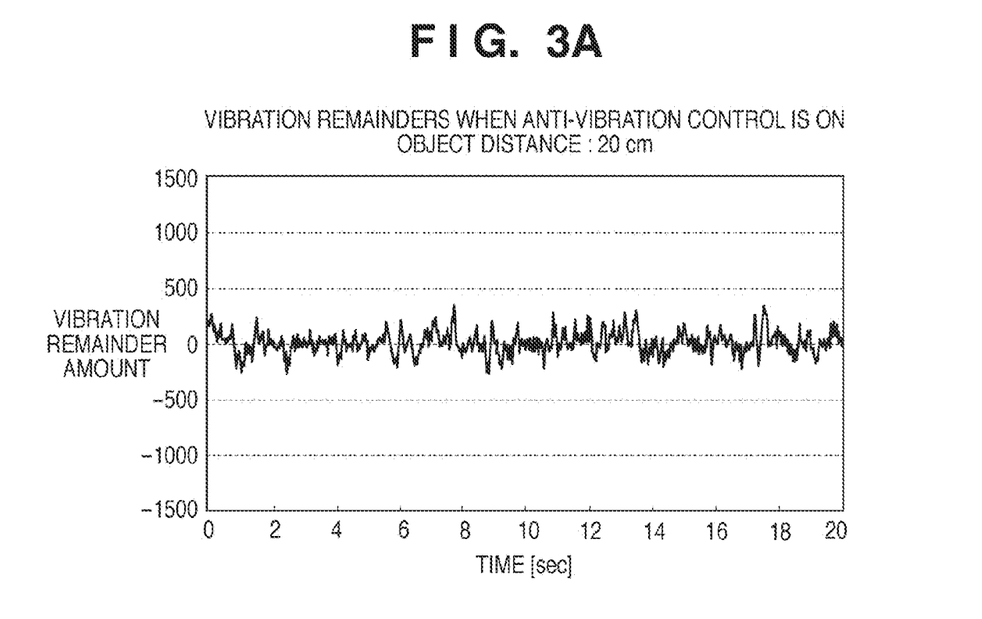
FIGS. 3A and 3B are graphs showing vibration remainders (image motion vector detected amount) at the time of taking moving image.
Figure 3B:
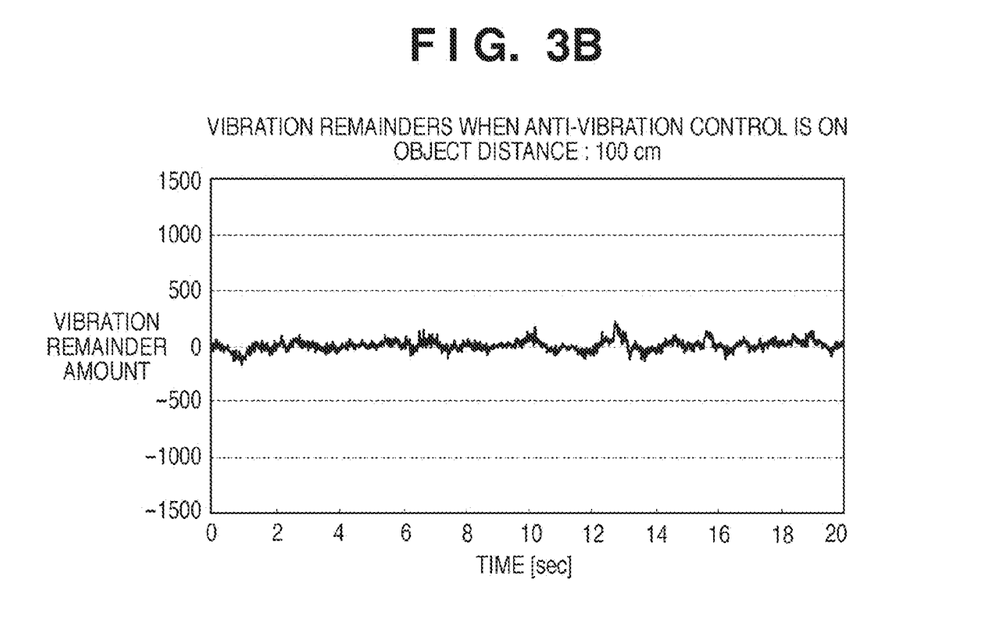
Figure 4A:
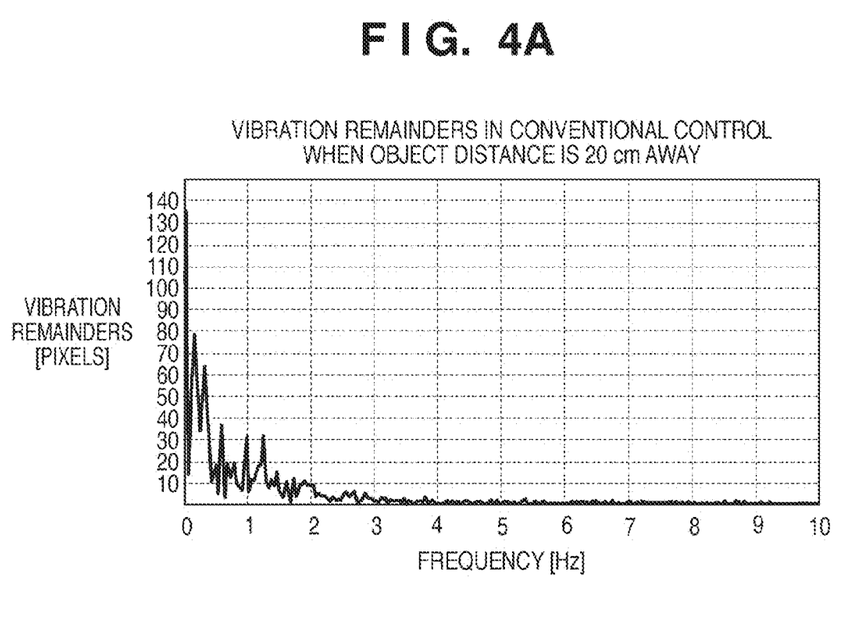
FIG. 4A is a graph showing frequency components of vibration remainders.
Figure 4B:
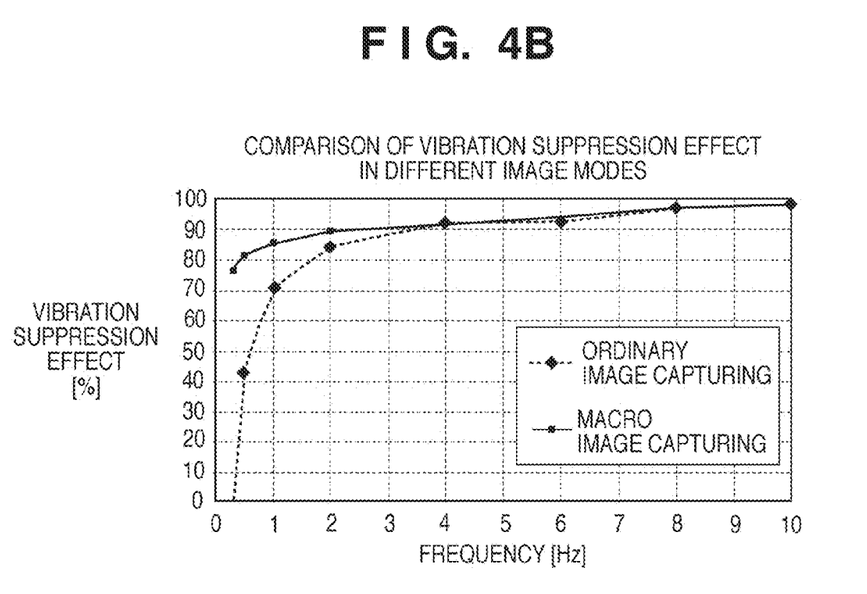
FIG. 4B is a graph showing vibration suppression effects in the first embodiment.
Figure 5B:
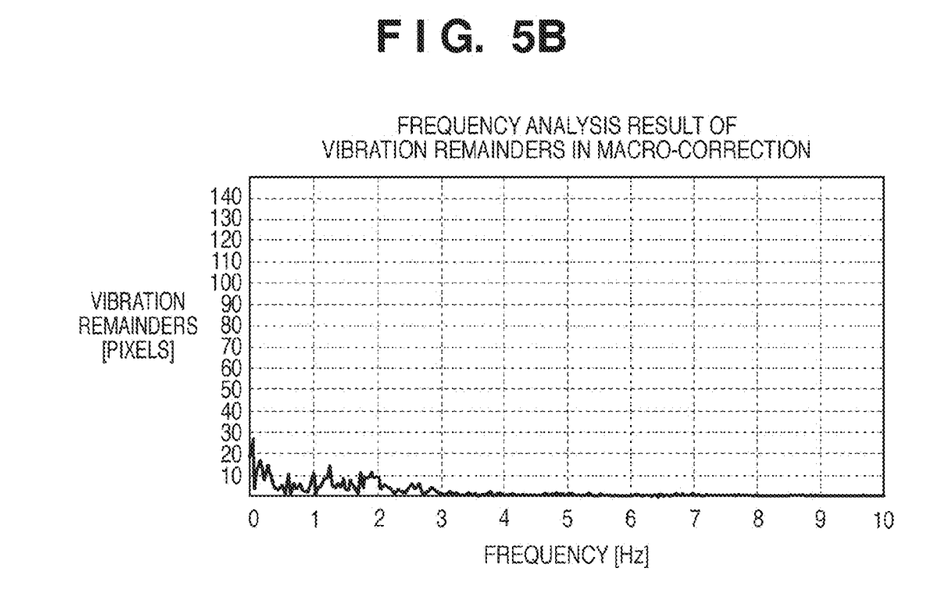
FIG. 5B is a graph showing frequency components of vibration remainders in the first embodiment.

When macro-image are taken, as mentioned above, since more parallel vibration components are detected than rotational vibration, there are more vibration remainders in macro-image than in ordinary moving image. FIGS. 3A and 3B show measurement results of the vibration remainder amount in different object distances when conventional anti-vibration control is performed. FIG. 3A shows vibration remainders in a case where an object of 20 centimeters away is captured, and FIG. 3B shows vibration remainders in a case where an object of 1 meter away is captured. The abscissa axis in FIGS. 3A and 3B represents time, while the ordinate axis represents the number of vibration remainder pixels on the image sensor 135. The result shows that the vibration remainder is larger when the object distance is 20 centimeters. FIG. 4A shows a result of frequency analysis of differences between the vibration remainders obtained in the two object distances shown in FIGS. 3A and 3B. According to FIG. 4A, vibration remainder signals which mainly have 2 Hz or less are dominant. In other words, in taking macro-image, parallel vibration can be reduced if the aforementioned vector correction is effectively performed and correction on the frequency components having 2 Hz or less is reinforced. In order to realize this, if the object distance detector 126 detects from object distance data that the object is in close proximity, the output setting unit 127 changes the gain of the amplifier 139. In other words, the gain which feeds back the image motion vector detected by the movement detector 138 is changeable. FIG. 5B shows a result of frequency analysis of the vibration remainder amount in a case where macro-correction according to the present embodiment is performed. The result shows that frequency components having 2 Hz or less is suppressed. Note that, a unit of the vibration remainder amount is [Pixel] in both FIGS. 4A and 5B.

Figure 2:
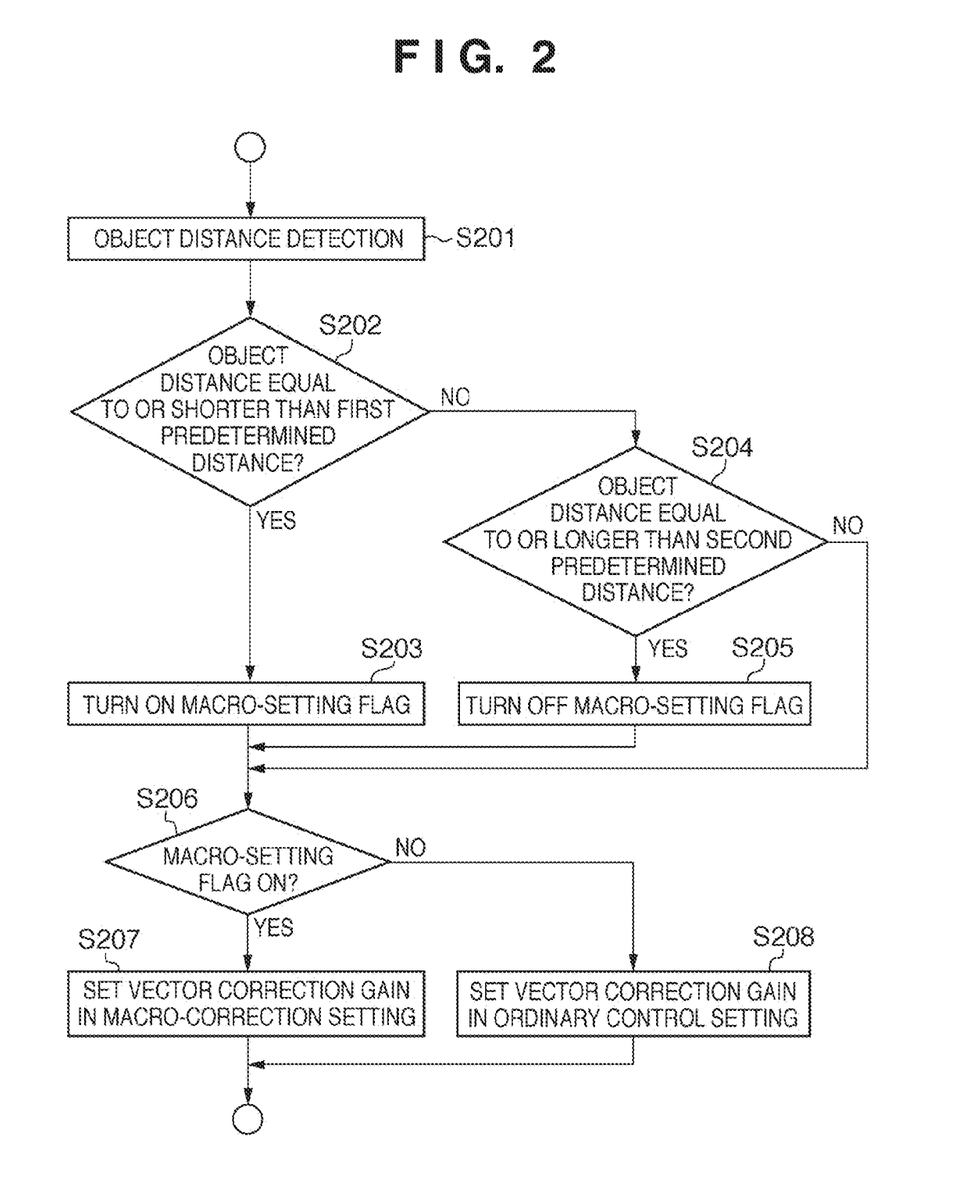
FIG. 2 is a flowchart describing an operation of a microcomputer according to the first embodiment.

FIG. 2 is part of the flowchart of the program executed by the microcomputer 120, and shows an operation that is characteristic of the present embodiment. Hereinafter, an operation of the present embodiment is described with reference to FIG. 2.

In step S201 in FIG. 2, an object distance is detected by an operation of the object distance detector 126. In step S202, it is determined whether the object distance detected in step S201 is shorter than or equal to a first predetermined distance. As a result of object distance detection, if the object distance is shorter than or equal to the first predetermined distance, a macro-setting flag is turned ON in step S203. If the object distance is longer than the first predetermined distance, then in step S204, it is determined whether the object distance is longer than or equal to a second predetermined distance. If the object distance is longer than or equal to the second predetermined distance, a macro-setting flag is turned OFF in step S205. If the object distance is less than the second predetermined distance, flag operation is not performed, and the control proceeds to step S206.

Herein, the relation between the first and second predetermined distances is:

$$\text{first predetermined distance} < \text{second predetermined distance} \tag{1}$$

By the flag operation from steps S202 to S205, ON/OFF setting flags are made to have hysteresis. By making the vector gain control have hysteresis, hunting phenomena in changes of the characteristics are prevented. Note that the difference between the first and second predetermined distances is decided based on the depth of field.

In step S206, macro-setting flag ON/OFF determination is performed. If a macro-setting flag is ON, the gain setting (vector correction gain) of the amplifier 139 is changed to macro-correction setting (setting that increases the gain from ordinary control) in step S207. If a macro-setting flag is OFF in step S206, the output setting of the amplifier 139 is set in the ordinary control setting in step S208.

When the above-described control detects macro-image capture, the vector correction gain is increased to achieve effective correction of detected parallel vibration, and influences of vibration remainders can be reduced in taking macro-image. Note that in a case where macro-image capture is detected, if panning is detected by the vibration correction amount calculator 105, the macro-setting flag turned on in step S203 is kept, and the vector correction gain is reduced to the level that does not influence the vibration correction or reduced to zero. When panning ends, more specifically, after elapse of predetermined time from detection of no panning, the vector correction gain is again set for macro-image.

In the configuration of the lens unit 129 according to the present embodiment, the sensitivity level of the shift lenses 133 differs from the wide-end side to the telephoto-end side. The correction angle of the shift lenses is larger on the wide-end side than on the telephoto-end side. Assuming that the lens magnification is 10 times, the correction angle at the wide end is about ten times the correction angle at the telephoto end. As a result, even if a vector correction gain is increased, problems such as "dead-end" lenses do not occur. Therefore, by raising a vector gain in macro-image detection at the wide end, vibration remainders can sufficiently be reduced.

[Second Embodiment]

Figure 6:
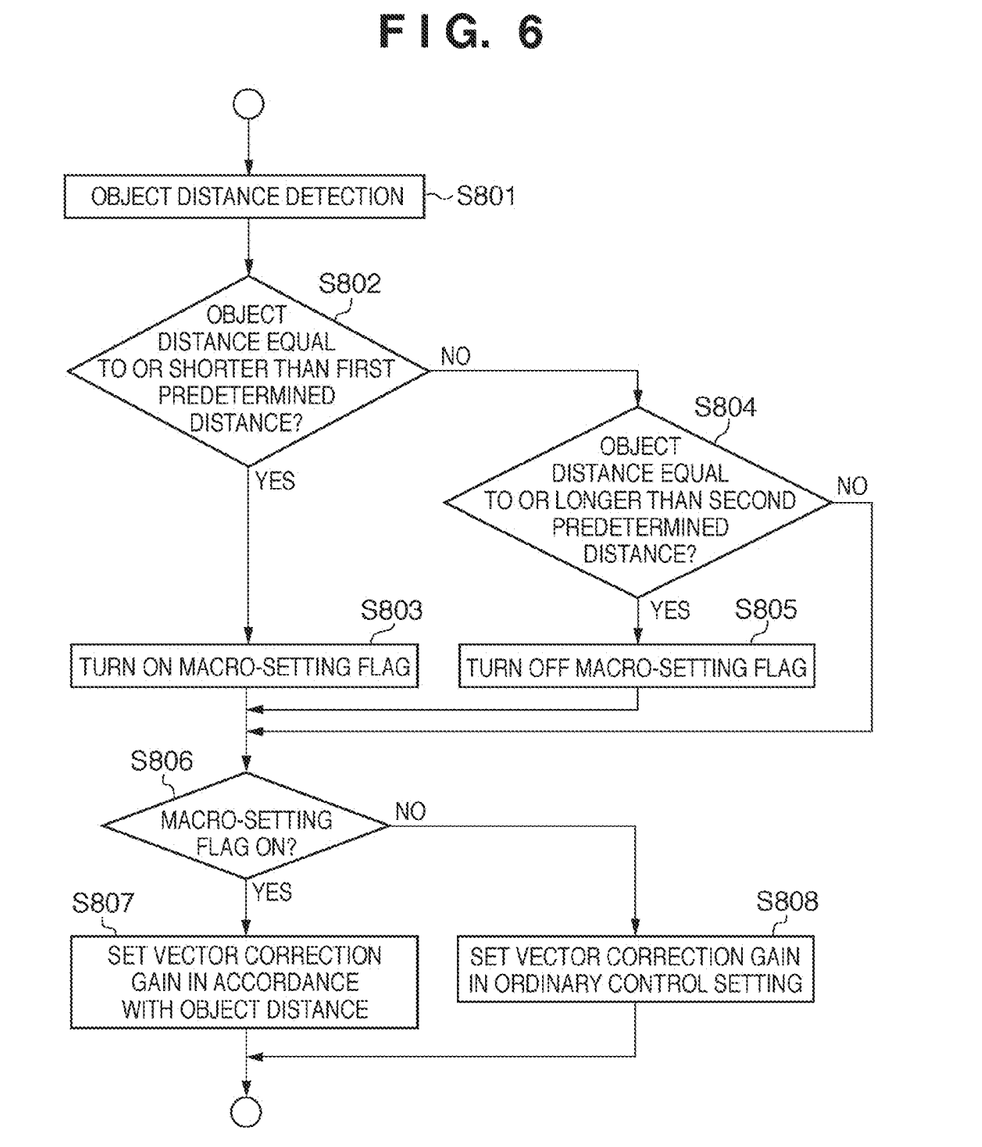
FIG. 6 is a flowchart describing an operation of a microcomputer according to the second embodiment.

FIG. 6 is a flowchart describing an operation of the microcomputer 120 according to the second embodiment of the present invention. This embodiment describes a method of changing the vector gain in accordance with conditions, such as an object distance. Note that the configuration of an image capture apparatus is the same as that of the first embodiment.

As mentioned above, FIGS. 3A and 3B show vibration remainders in a case where an object of 20 centimeters away and an object of 1 meter away are captured. The vibration remainder amount varies in some degree depending on an object distance. The shorter the object distance, the more increased amplitude of the vibration remainder. In the second embodiment, a vector amount gain is changed in accordance with an object distance in order to enhance the effect of vibration remainder reduction.

Since FIG. 6 differs from FIG. 2 only by the operation of step S807, descriptions of other steps are omitted. In step S806, if a macro-setting flag is ON, an output setting of vector correction suitable for the object distance is set.

Figure 7A:
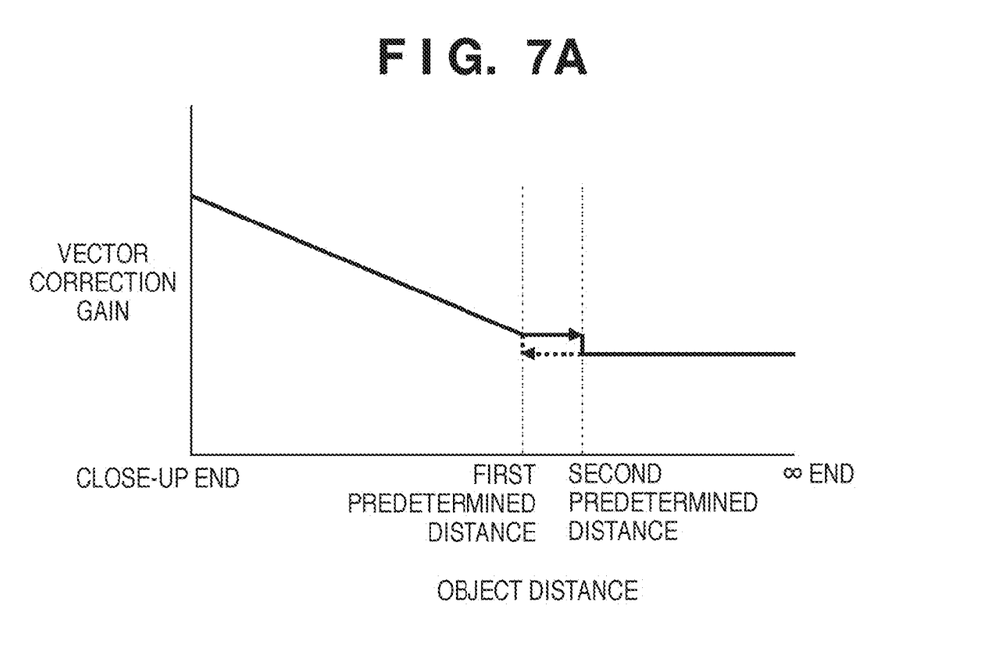
FIGS. 7A and 7B are exemplary view of output setting in accordance with an object distance.
Figure 7B:
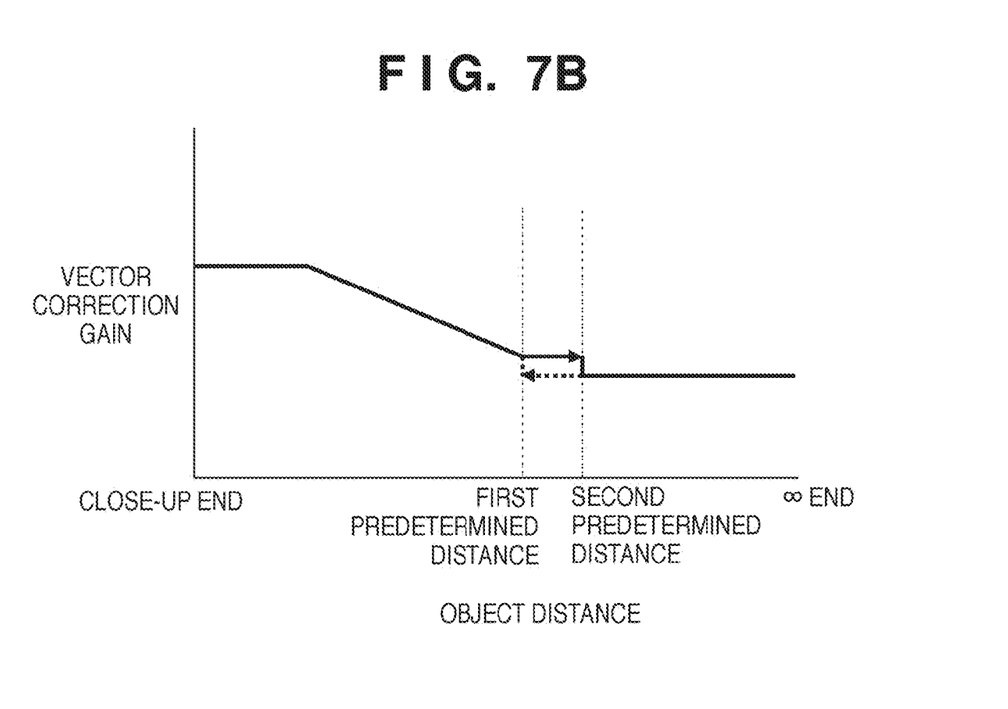

FIGS. 7A and 7B show an example of output setting in accordance with an object distance. In the characteristic shown in FIG. 7A, the gain is increased as the object distance nears the close-up end.

When an object distance nears the close-up side, parallel vibration components increase, as mentioned above. Also, the detected frequency component changes slightly; the detected frequency component becomes higher as the object distance becomes shorter. Therefore, when an object distance is in the closest approach distance, for example, 1 centimeter, if the vector correction gain is increased, low-frequency vibration can be removed, but high-frequency jiggly vibration becomes conspicuous. However, when there are low-frequency vibration remainders, the jiggly vibration becomes less conspicuous. In view of this, a characteristic shown in FIG. 7B is set (an upper limit is set in the correction gain) so that, when an object distance is particularly short, vibration remainders are left unremoved. By virtue of this setting, not only high-frequency vibration becomes inconspicuous, but also low-frequency vibration can be removed; and as a result, vibration remainders in taking macro-image can be reduced. As described above, by changing the vector gain in accordance with an object distance, vibration remainders at the time of taking macro-images at the wide end can further be reduced.

In the above description, parameters used for changing the vector gain are the object distance alone. However, when a focal length changes, vibration caused mainly by the photographer's body movement increases at the telephoto end even though the parallel vibration amount does not change. In view of this, changing the gain not only in accordance with an object distance but also in accordance with a zoom factor is also effective for reducing vibration remainders at the time of taking macro-image.

[Third Embodiment]

Figure 8:
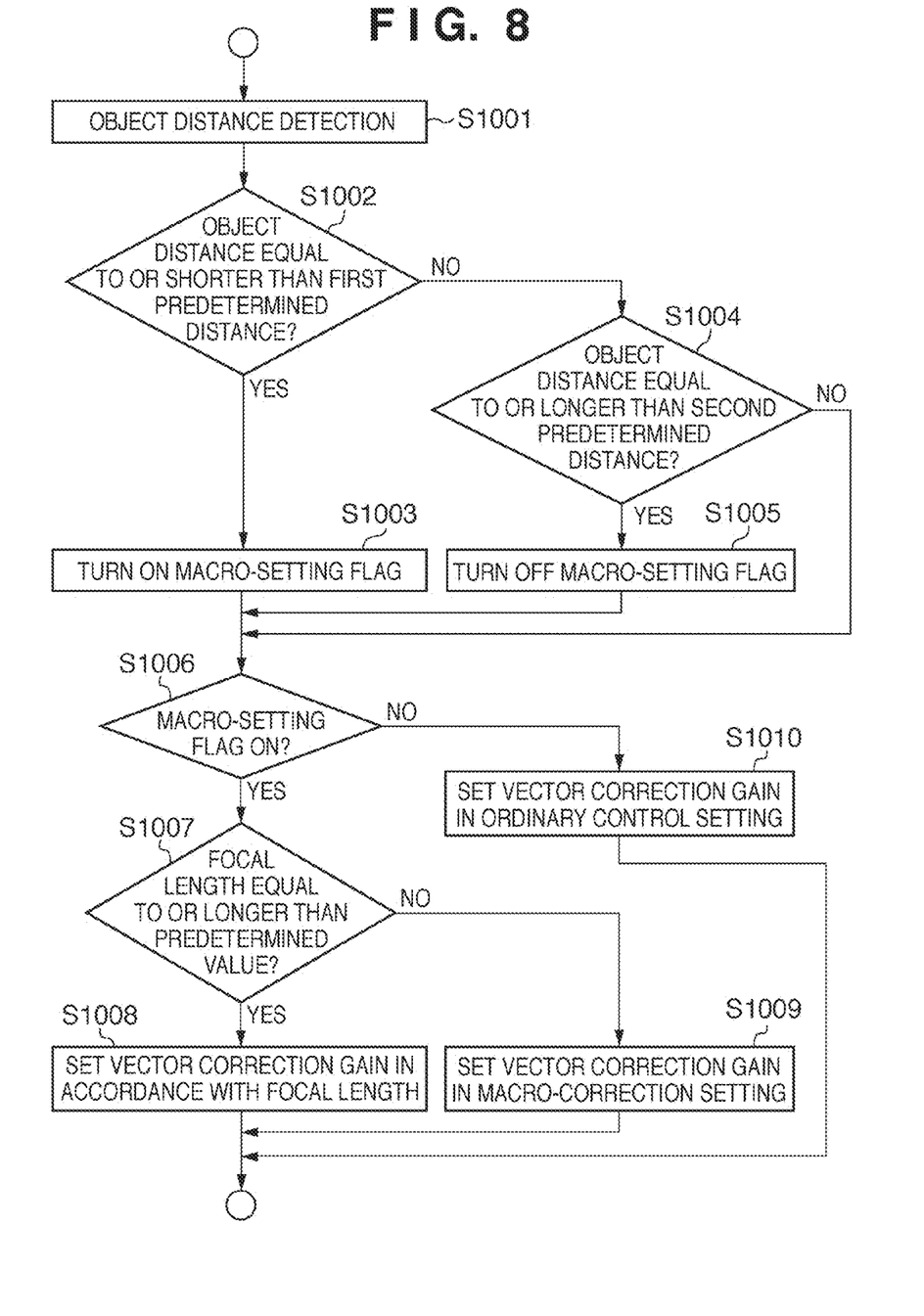
FIG. 8 is a flowchart describing an operation of a microcomputer according to the third embodiment.

Correction in taking macro-image on the wide-end side has been described above. In the third embodiment, correction in taking macro-image on the telephoto-end side is described. FIG. 8 is a flowchart describing an operation of the microcomputer 120 according to the third embodiment of the present invention. Since steps S1001 to S1006 in FIG. 8 are similar to steps S201 to S206 in FIG. 2 and steps S801 to S806 in FIG. 6, descriptions are omitted.

In a case where the macro-setting flag is ON in step S1006, it is determined in step S1007 whether or not the focal length is longer than or equal to a predetermined value. If the focal length is longer than or equal to the predetermined value, then in step S1008, the vector correction gain for macro correction is changed to a value according to the focal length. With the use of the lenses having a short closest approach distance at the telephoto end and the shift lenses 133 of a wide correctable range, it is possible to take macro-image in all zooming ranges. However, taking the lens size into consideration, a sufficient correction angle may not be able to be secured when macro-image are taken at the telephoto end. In view of the above, in steps S1007 and S1008, taking a correction angle into consideration, determination is made as to whether or not the focal length is longer than or equal to a predetermined value having a correction range that can achieve sufficient vibration correction effect, and output setting is so set that the lenses do not come to the "dead end." If the focal length is less than the predetermined value, then in step S1009, output setting for macro-correction is set. Meanwhile, in a case where the macro-setting flag is OFF in step S1006, the vector correction gain is set in an ordinary-setting value in step S1010.

Figure 9A:
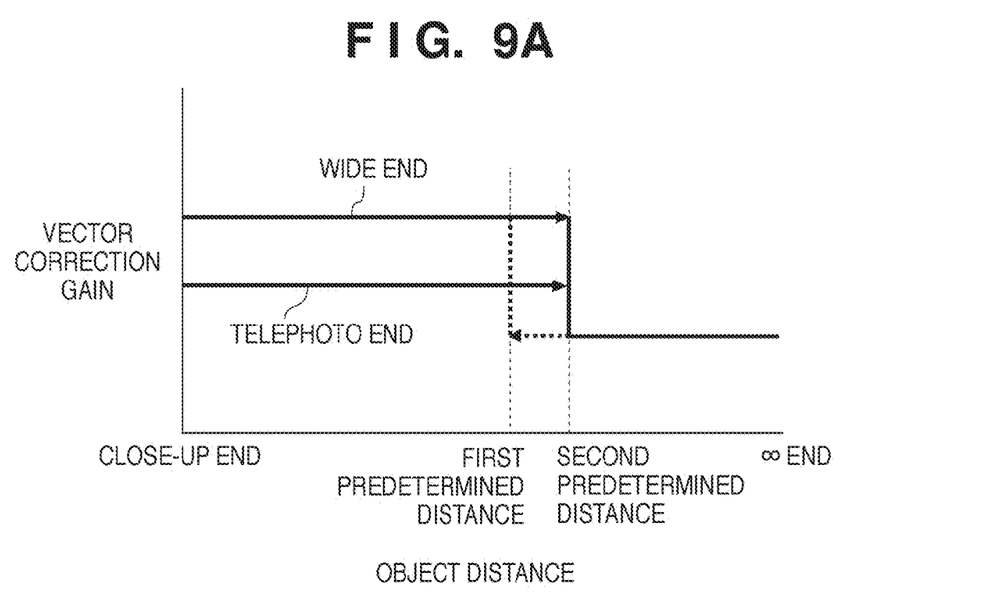
FIGS. 9A and 9B are views of output setting in accordance with a focal length and an object distance.
Figure 9B:
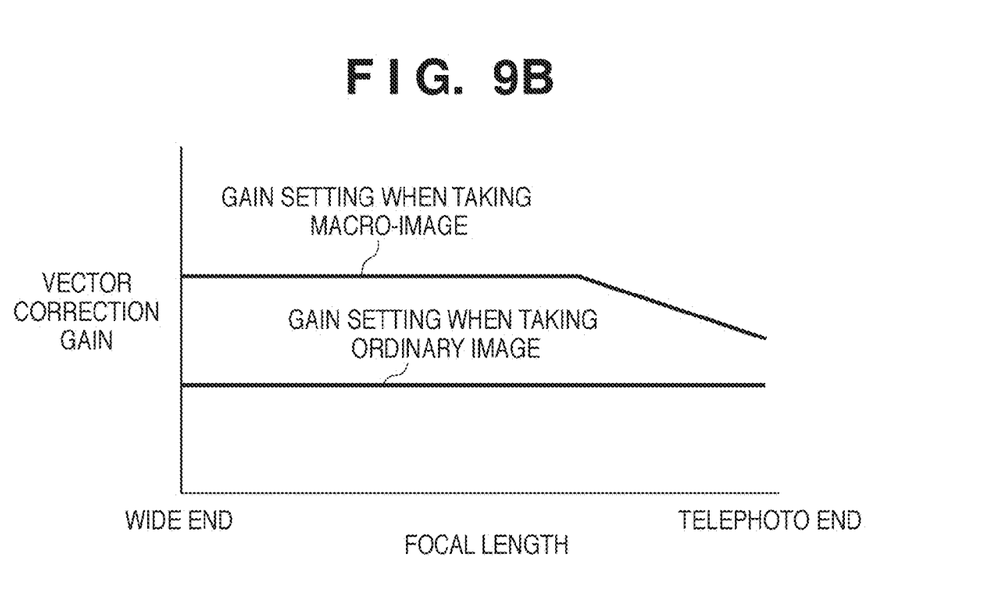

FIGS. 9A and 9B show a vector correction gain changing method which employs the method according to the present embodiment, with the use of a lens capable of taking macro-image in omnifocal length. FIG. 9A shows changes in the vector correction gain in a case of taking macro-image at the wide end and telephoto end. FIG. 9B shows how the vector correction gain changes in accordance with a focal length at the time of taking macro-image and ordinary moving image.

In accordance with the correctable angle at the telephoto end, the vector correction output setting is set as shown in FIG. 9A, and the setting is changed to FIG. 9B as the focal length is shortened to the wide end. In this manner, the image capture apparatus can deal with changes in the correctable angle from the wide end to the telephoto end. By virtue of the above-described setting, it is possible to reduce vibration remainder influences not only in taking macro-image at the wide end but also at the telephoto end.

Note that if there is a sufficient correction angle at the telephoto end, the vector correction output setting does not have to be changed in accordance with the focal length, as similar to the case of taking macro-image at the wide end. Needless to say, changing the output setting in steps S1008 and S1009 in accordance with a focal length and an object distance gives a better influence for reduction in parallel vibration when taking macro-image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-296385, filed Dec. 25, 2009, which is hereby incorporated by reference herein in its entirety.

What is claimed is:

1. An image capture apparatus comprising:
an image sensor configured to capture an object image which is formed by an imaging lens;
a first detection unit configured to detect vibration of said image capture apparatus;
a second detection unit configured to detect movement of the image based on an image signal which is output by said image sensor;
a distance detection unit configured to detect an object distance, which is a distance from said image capture apparatus to the object;
a changing unit configured to change an output of said second detection unit based on the object distance which is detected by said distance detection unit; and
a driving unit configured to drive a vibration correction unit, which optically performs vibration correction, based on an output of said first detection unit and the output of said second detection unit which is changed by said changing unit,
wherein in a case where the object distance detected by said distance detection unit is shorter than or equal to a first predetermined distance, said chancing unit increases the output of said second detection unit.

2. The image capture apparatus according to claim 1, wherein in a case where the object distance detected by said distance detection unit is short, said changing unit increases the output of said second detection unit as the object distance becomes shorter.

3. The image capture apparatus according to claim 2, wherein in a case where the object distance detected by said distance detection unit is shorter than a predetermined distance, said changing unit sets an upper limit on changes in the output of said second detection unit.

4. The image capture apparatus according to claim 2, wherein in a case where the object distance detected by said distance detection unit is longer than a second predetermined distance, said changing unit reinstates the output of said second detection unit.

5. The image capture apparatus according to claim 1, further comprising a focal length detection unit configured to detect a focal length in a case where a magnification unit, which changes magnification or an object image arranged in the imaging lens, changes the magnification, said changing unit further changes the output of said second detection unit based on the focal length detected by said focal length detection unit.

6. The image capture apparatus according to claim 5, wherein said changing unit changes the output of said second detection unit low when the focal length is at a telephoto end rather than at a wide end.

7. The image capture apparatus according to claim 5, wherein said changing unit changes the output of said second detection unit low as a movable amount of said vibration correction unit becomes small.

8. A control method of an image capture apparatus having an image sensor for capturing an object image which is formed by an imaging lens, comprising the steps of:
first detecting vibration of the image capture apparatus;
second detecting movement of the image based on an image signal which is output by the image sensor;
detecting an object distance, which is a distance from the image capture apparatus to the object;
changing an output of said second detecting step based on the object distance which is detected in said distance detecting step; and
driving a vibration correction unit, which optically performs vibration correction, based on an output of said first detecting step and the output of said second detecting step which is changed by said changing step,
wherein in a case where the object distance detected by said distance detection step is shorter than or equal to a first predetermined distance, said changing step increases the output of said second detection unit.

9. An image capture apparatus comprising:
an image sensor configured to capture an object image which is formed by an imaging lens;
a first detection unit configured to detect vibration of said image capture apparatus;
a second detection unit configured to detect a motion vector of the image based on an image signal which output by said image sensor;
a distance detection unit configured to detect an object distance, which is a distance from said image capture apparatus to the object;
a changing unit configured to change, based on the object distance, an output of said second detection unit; and
an image stabilization unit configured to optically perform the image blur correction based on an output of said first detection unit and the output of said second detection unit,
wherein in a case where the object distance detected by said distance detection unit is shorter than or equal to a first predetermined distance, said changing unit increases a gain of the output of said second detection unit.

10. A control method of an image capture apparatus having an image sensor for capturing an object image which is formed by an imaging lens, comprising the steps of:
first detecting vibration of the image capture apparatus;
second detecting a motion vector of the image based on an image signal which is output by the image sensor;
detecting an object distance, which is a distance from said image capture apparatus to the object;
changing, based on the object distance, an output of said second detection step; and
optically performing the image blur correction based on an output of said first detection step and the output of said second detection step,
wherein in a ease where the object distance detected by said distance detection step is shorter than or equal to a first predetermined distance, said changing step increases a gain of the output of said second detection unit.

11. An image capture apparatus comprising;
an image sensor configured to capture an object image which is formed by an imaging lens;
a detection unit configured to detect movement of the image based on an image signal which is output by said image sensor;
a distance detection unit configured to detect an object distance, which is a distance from said image capture apparatus to the object;
a changing unit configured to change an output of said detection unit based on the object distance which is detected by said distance detection unit; and
a driving unit configured to drive a vibration correction unit, which optically performs vibration correction, based on the output of said detection unit which is changed by said changing unit,
wherein in a case where the object distance detected by said distance detection unit is shorter than or equal to a first predetermined distance, said changing unit increases the output of said detection unit.

12. The image capture apparatus according to claim 11, wherein the movement of the image is a motion vector and in a case where the object distance detected by said distance detection unit is short, said changing unit increases a gain of the output of said detection unit, comparing with a case where the object distance is long.

13. A control method of an image capture apparatus having an image sensor for capturing an object image which is formed by an imaging lens, comprising the steps of:
   detecting movement of the image based on an image signal which is output by the image sensor;
   detecting an object distance, which is a distance from said image capture apparatus to the object;
   changing an output of said detecting step based on the object distance which is detected in said distance detecting step; and
   driving a vibration correction unit, which optically performs vibration correction, based on the output of said detecting step which is changed by said changing step,
   wherein in a case where the object distance detected by said distance detection step is shorter than or equal to a first predetermined distance, said changing step increases the output of said detection unit.

14. The control method according to claim 13, wherein the movement of the image is a motion vector and in a case where the object distance detected by said distance detection step is short, said changing step increases a gain of the output of said movement
   detection step, comparing with a case where the object distance is long.

15. An image capture apparatus comprising:
   an image sensor configured to capture an object image which is formed by an imaging lens;
   a detection unit configured to detect a motion vector of the image based on an image signal which is output by said image sensor;
   a distance detection unit configured to detect an object distance, which is a distance from said image capture apparatus to the object;
   a changing unit configured to change an output of said detection unit based on the object distance which is detected by said distance detection unit; and
   a driving unit configured to drive a vibration correction unit, which optically performs vibration correction, based on the output of said detection unit which is changed by said changing unit,
   wherein in a case where the object distance detected by said distance detection unit is shorter than or equal to a first predetermined distance, said changing unit increases a gain of the output of said detection unit.

16. A control method of an image capture apparatus having an image sensor for capturing an object image which is formed by an imaging lens, comprising the steps of:
   detecting a motion vector of the image based on an image signal which is output by the image sensor;
   detecting an object distance, which is a distance from said image capture apparatus to the object;
   changing an output of said detecting step based on the object distance which is detected in said distance detecting step; and
   driving a vibration correction unit, which optically performs vibration correction, based on the output of said detecting step which is changed by said changing step,
   wherein in a case where the object distance detected by said distance detection step is shorter than or equal to a first predetermined distance, said changing step increases a gain of the output of said detection unit.

17. An image capture apparatus comprising:
   an image sensor configured to capture an object image which is formed by an imaging lens;
   a detection unit configured to detect a movement of the image based on an image signal which is output by said image sensor;
   a changing unit configured to change an output of said detection unit based on whether or not it is in a macro-image capture state; and
   a driving unit configured to drive a vibration correction unit, which optically performs vibration correction, based on the output of said detection unit which is changed by said changing unit,
   wherein in a case where it is in the macro-image capture state, said changing unit increases a gain of the output of said detection unit.

18. A control method of an image capture apparatus having an image sensor for capturing an object image which is formed by an imaging lens, comprising the steps of:
   detecting a movement of the image based on an image signal which is output by the image sensor;
   changing an output of said detecting step based on whether or not it is in a macro-image capture state; and
   driving a vibration correction unit, which optically performs vibration correction, based on the output of said detecting step which is changed by said changing step,
   wherein in a case where it is in the macro-image capture state, said changing step increases a gain of the output of said detection unit.

19. An image capture apparatus according to claim 17, wherein said macro-image capture state is for capturing an object in close proximity to the image capture apparatus.

20. A control method of an image capture apparatus according to claim 18, wherein said macro-image capture state is for capturing an object in close proximity to the image capture apparatus.

* * * * *